(12) United States Patent
Smith et al.

(10) Patent No.: US 11,738,514 B1
(45) Date of Patent: Aug. 29, 2023

(54) METHOD AND SYSTEM TO REDUCE WASTE DURING 3D PRINTING

(71) Applicant: International Business Machines Corporation, Armonk, NY (US)

(72) Inventors: Tyler Smith, Rochester, MN (US); Eric J. Campbell, Rochester, MN (US); Joseph Goergen, Adams, MN (US); Minoru Fernando, Rochester, MN (US); Timothy Lindquist, Rochester, MN (US); Justin Somers, Westminster, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/651,083

(22) Filed: Feb. 15, 2022

(51) Int. Cl.
*B29C 64/357* (2017.01)
*B29C 64/124* (2017.01)
(Continued)

(52) U.S. Cl.
CPC .......... *B29C 64/357* (2017.08); *B29C 64/124* (2017.08); *B29C 64/264* (2017.08);
(Continued)

(58) Field of Classification Search
CPC ... B29C 64/357; B29C 64/264; B29C 64/124; B29C 64/40; B33Y 30/00; B33Y 40/00
(Continued)

(56) References Cited

U.S. PATENT DOCUMENTS

| | | | |
|---|---|---|---|
| 9,688,020 B2 | 6/2017 | Teken et al. | |
| 2005/0023719 A1* | 2/2005 | Nielsen | B29C 64/40 |
| | | | 264/494 |

(Continued)

FOREIGN PATENT DOCUMENTS

CN    105365220 B    10/2017

OTHER PUBLICATIONS

Johnston et al., "3D Printing in Zero-G ISS Technology Demonstration," In AIAA Space 2014 Conference and Exposition (p. 4470), 2014.

(Continued)

*Primary Examiner* — Joseph S Del Sole
*Assistant Examiner* — Lawrence D. Hohenbrink, Jr.
(74) *Attorney, Agent, or Firm* — Kimberly S. Zillig

(57) ABSTRACT

Described is a system for reducing waste during 3D printing, which includes a printing component configured to print a plurality of layers. Each of the plurality of layers comprises at least one of a first curable material and a second curable material. The system also includes a leveling component configured to remove excess material from each of the plurality of layers after each layer is printed. The system includes a first recirculation loop configured to return the excess material that includes only the first curable material back to the printing component, and a second recirculation loop configured to return the excess material that includes only the second curable material back to the printing component. In addition, the system includes a waste bin configured to receive the excess material that includes both the first curable material and the second curable material.

20 Claims, 4 Drawing Sheets

(51) Int. Cl.
   *B33Y 40/00* (2020.01)
   *B29C 64/40* (2017.01)
   *B33Y 30/00* (2015.01)
   *B29C 64/264* (2017.01)

(52) U.S. Cl.
   CPC .............. *B29C 64/40* (2017.08); *B33Y 30/00* (2014.12); *B33Y 40/00* (2014.12)

(58) Field of Classification Search
   USPC ........................................................ 264/37.1
   See application file for complete search history.

(56) References Cited

U.S. PATENT DOCUMENTS

| 2017/0036404 | A1  | 2/2017  | Rengers et al. |
|---|---|---|---|
| 2022/0339861 | A1* | 10/2022 | Recher .................. B29C 64/245 |
| 2022/0410482 | A1* | 12/2022 | Dubelman .............. B29C 64/35 |

OTHER PUBLICATIONS

Stratasys, "PolyJet Technology for 3D Printing," https://www.stratasys.com/polyjet-technology, Retrieved from internet on Oct. 13, 2021, 8 pgs.

Woern et al., "Fused Particle Fabrication 3-D Printing: Recycled Materials' Optimization and Mechanical Properties," Materials, 11(8), 1413, published Aug. 12, 2018.

Xu et al., "Environment-friendly and reusable ink for 3D printing of metallic structures," Materials & Design, 160 (2018) 262-269.

YouTube, "PolyJet Technology," [Transcript], Solid Concepts, May 15, 2013, https://youtu.be/Som3CddHfZE, Retrieved from internet on Oct. 13, 2021, 8 pgs.

* cited by examiner

METHOD AND SYSTEM TO REDUCE WASTE DURING 3D PRINTING

BACKGROUND

The present disclosure relates generally to three-dimensional (3D) printing, and more specifically, to a method and system to reduce waste during 3D printing.

Material jetting 3D printers can utilize ultraviolet (UV) curable resin and a UV light source to create 3D structures. For example, PolyJet 3D systems involve 3D printing technology known for its customizable material properties and excellent surface finish. It works by jetting UV curable resin onto a build tray in a process that is somewhat similar to inkjet printing. During the printing process used to build (or "print") 3D workpieces, photopolymer liquid resin is deposited one thin layer at a time. The layers are each cured via exposure to UV light, solidifying them into solid material matching a programmed computer-assisted design (CAD) file. Such a process repeats itself layer by layer until an entire part has been constructed.

In the current technology, a layer is deposited, and then a leveler removes excess, non-solidified resin material to improve printing accuracy and ensure layer uniformity. The excess material is disposed of or discarded in a waste bin.

SUMMARY

According to some embodiments of the disclosure, there is provided a system for reducing waste during 3D printing of a 3D article. The system includes a printing component configured to print a plurality of layers to form the 3D article, wherein each of the plurality of layers comprises at least one of a first curable material and a second curable material. The system also includes a leveling component configured to remove excess material from each of the plurality of layers after each layer is printed. Further, the system includes a first recirculation loop configured to return the excess material from each of the plurality of layers that includes only the first curable material back to the printing component for re-use, and a second recirculation loop configured to return the excess material from each of the plurality of layers that includes only the second curable material back to the printing component for re-use. In addition, the system includes a waste bin configured to receive the excess material from each of the plurality of layers that includes both the first curable material and the second curable material.

According to some embodiments of the disclosure, there is provided a method for reducing waste during 3D printing of a 3D article. The method includes printing a photocurable polymer composition with a 3D printer to form a layer, wherein the photocurable polymer composition comprises at least one of a first photocurable polymer resin and a second photocurable polymer resin. For each layer, the method includes determining if more than one photocurable polymer resin is included in the photocurable polymer composition forming each layer. For each layer that includes more than one photocurable polymer resin, the method includes leveling the layer which produces excess material, including more than one photocurable polymer resin, and depositing the excess material including more than one photocurable polymer resin in a waste bin. For each layer that includes only one photocurable polymer resin, the method includes determining if the one photocurable polymer resin is a support material. For each photocurable polymer resin that is the support material, the method includes leveling the layer which produces excess support material and depositing the excess support material in a support material recirculation loop configured to re-use the excess support material in the printing step. For each photocurable polymer resin that is not the support material, the method includes leveling the layer which produces excess part material and depositing the excess part material in a part material recirculation loop configured to re-use the excess part material in the printing step.

According to some embodiments of the disclosure, there is provided a method for reducing waste during 3D printing of a 3D article. The method includes printing a photocurable polymer composition with a 3D printer to form a layer, wherein the photocurable polymer composition comprises at least one of a first photocurable polymer resin and a second photocurable polymer resin. For each layer, the method further includes determining if only one photocurable polymer resin is included in the photocurable polymer composition forming each layer. For each layer that includes only one photocurable polymer resin, the method also includes determining if the one photocurable polymer resin is a support material. For each photocurable polymer resin that is the support material, the method includes leveling the layer which produces excess support material and depositing the excess support material in a support material recirculation loop configured to re-use the excess support material in the printing step. For each photocurable polymer resin that is not the support material, the method includes leveling the layer which produces excess part material, and depositing the excess part material in a part material recirculation loop configured to re-use the excess part material in the printing step.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
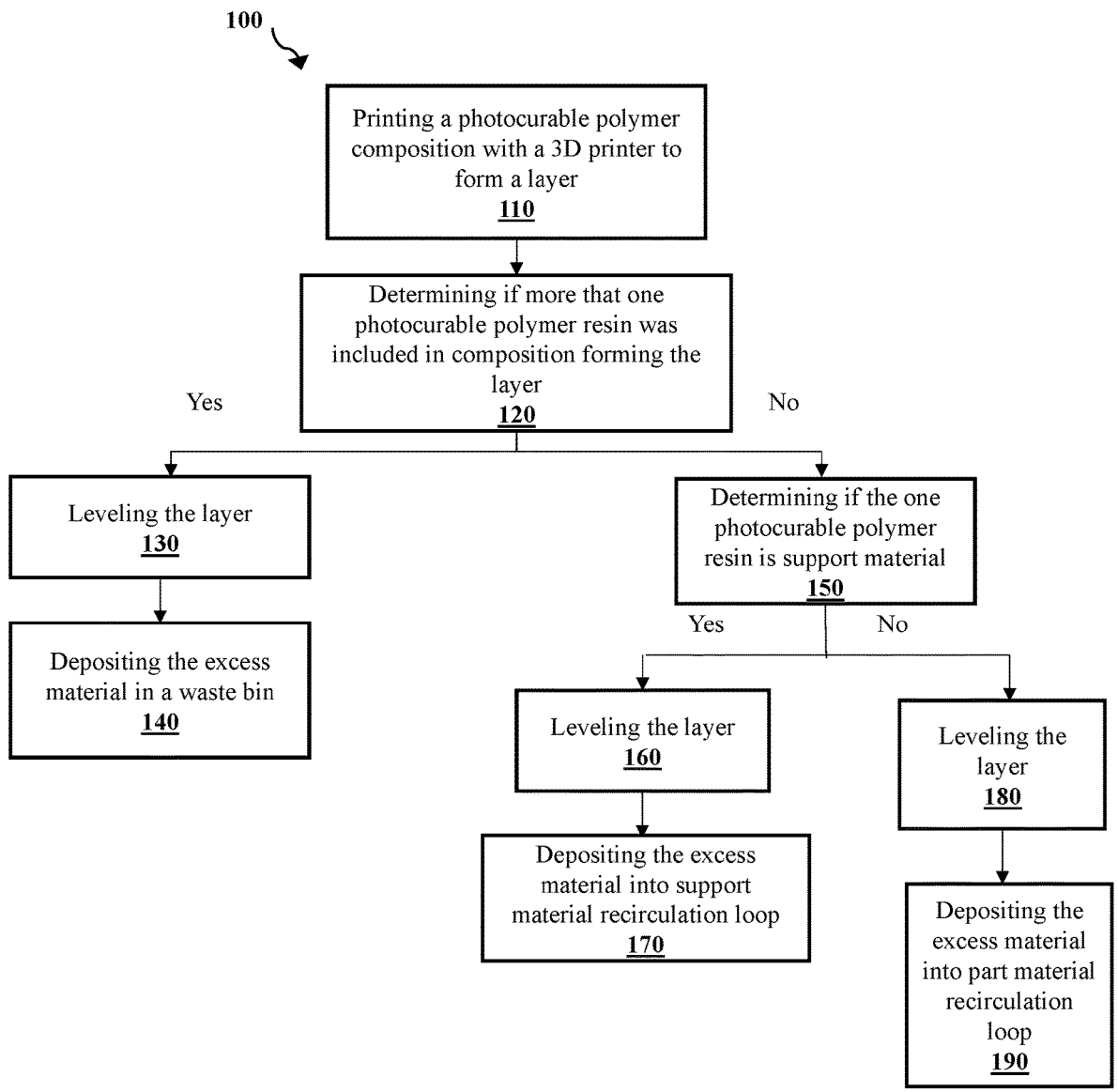
FIG. 1 is a flow diagram illustrating a method for reducing waste during 3D printing, according to illustrative embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to reducing waste during 3D printing by recycling resins if only one resin is included in a given layer. After a single material layer is printed and leveled, and before being cured, the leveled-off material can be recirculated back to be re-used during printing of another layer. If more than one resin is included in a layer, the leveled-off material cannot be re-used and is deposited in a waste bin and discarded. Depending on a given geometry of a 3D part that is printed, the amount of waste material that is generated from leveling can make up a significant percentage of the total amount of resin that is deposited. The resin materials are very expensive and waste generation increases the cost of printing. In addition, the waste material is toxic and difficult to handle and dispose of. While the present disclosure is not necessarily limited to such applications, various aspects of the disclosure may be appreciated through a discussion of various examples using this context.

Disclosed is a method and system to reduce waste resin during material jetting, 3D printing technologies. PolyJet 3D printing is one example of such a 3D printing technology that involves jetting UV curable resin onto a build tray in a process somewhat similar to inkjet printing. Other suitable 3D printing technologies are also contemplated by the present disclosure.

FIG. 1 is a flow diagram illustrating a method 100 for reducing waste during 3D printing, according to illustrative embodiments. During 3D printing, many thin layers of resin are deposited to build (or "print") 3D workpieces (or, for example, "objects," "articles," "prototypes," "parts," etc.). Depending on the type of 3D printing, different resins or materials can be used. In material jetting, or PolyJet technology, for example, photocurable polymeric liquid resins are deposited to form a 3D object. According to a CAD file (or other suitable program files, such as an .stl file, for example), a 3D printer lays down a plurality of layers to form an object. A print head, e.g., a nozzle or dispenser, is accordingly moved to a position to begin to form a 3D object with a first layer. The first step of method 100 is printing a photocurable polymer composition with a 3D printer to form a layer 110. The photocurable polymer composition is deposited by the print head on a build tray, for example, to form the first layer. More than one print head may be utilized with each dispenser having independently selected properties.

The photocurable polymer composition can be a silicone composition, for example. Other suitable photocurable polymer compositions are contemplated and can include, but not be limited to, transparent liquid polymer materials, rigid opaque liquid polymer materials, simulated polypropylene liquid polymer materials, rubber-like polymer materials, high-temperature liquid polymer materials, and bio-compatible materials.

The CAD file, for example, can instruct the printer to deposit at least one resin material (making up the photocurable polymer composition) in a given configuration or design for a given layer. In some objects, a support material (resin) can be used for support in a given layer or layers along with a build or part material (resin). In the 3D printing of some objects, support material, or "scaffolding" is necessary to be able to form the object. In some cases, the support material may be the same material used as the build/part material of the object, but in other cases it is not possible to use the same material. In PolyJet 3D printing, the support material can be dissolvable in order to be cleaned off the parts in a subsequent step.

In the disclosed method 100, a determination is made as to whether or not more than one photocurable polymer resin is included in the photocurable polymer composition forming the given layer 120. If more than one resin material is deposited in the layer, the layer is leveled with a leveling component 130, and the excess material is deposited or sent to a waste bin 140. If the excess resin that is leveled off by the leveler contains more than one material, it is not recyclable or re-useable and is considered waste. However, if it is determined that multiple resin materials were not included in the layer 120 (i.e., only a single layer was deposited), then a further determination is made (per the CAD file or other computer file) to confirm if the photocurable polymer resin material is only support, or scaffolding, material 150. If there is only support material in the layer, the layer is leveled 160 and the excess material that is leveled-off is deposited into a support material recirculation loop 170. On the other hand, if there is no support material in the layer, and there is only a single part (i.e., build) material in the layer, it is leveled 180 and the excess material is deposited into a part material recirculation loop 190.

The steps of method 100 are repeated for each layer of a plurality of layers that are deposited to form a 3D object. The two recirculation loops return the excess material back to a respective supply component or container that supplies the resin material to the print head for printing additional layers. If only one material is used or printed in a layer (either part material resin or support material resin), the excess resin is leveled-off and deposited in one of two recirculation loops used or designed for that material. If both of the multiple resin materials are deposited together in a given layer, the excess material is not re-useable and is disposed of in a waste bin 140. The recycling or recirculating of resin has the benefit of both reducing the production of harmful waste and of reducing the cost of 3D printing.

Figure 2A:
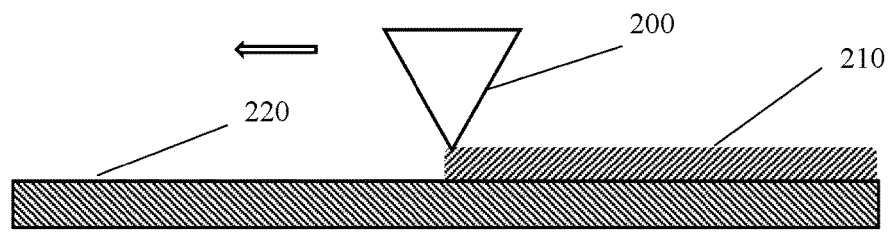
FIGS. 2A-2D illustrate schematic side views of steps of a 3D printing process, according to illustrative embodiments.

FIGS. 2A-2D illustrate schematic side views of steps of a 3D printing process, according to illustrative embodiments. In FIG. 2A, a print head 200 is shown moving in the direction of the arrow and depositing a layer 210 of resin on top of another layer 220 that was previously deposited and cured, for example. In a material 3D jetting printer, for example, one or a plurality of supply material reservoirs (not shown) can be subject to pressure and can be connected via a metering line (not shown) to one or a plurality of print heads. Although only one print head is shown, a plurality of print heads is contemplated, and each can operate independently of one another to construct a desired 3D object.

Figure 2B:
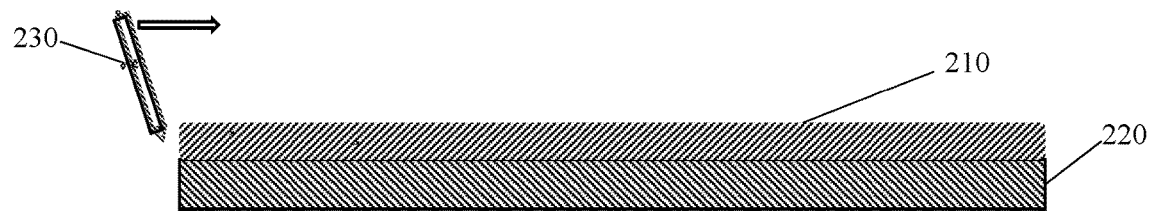
Figure 2C:
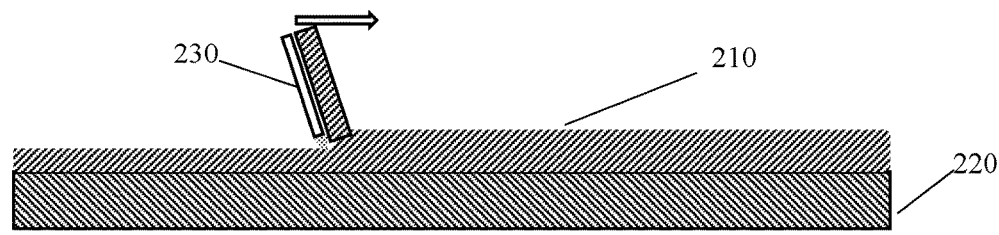

FIG. 2B shows layer 210 completely deposited on layer 220 before layer 210 is cured. A leveling component, or leveler, 230 is shown adjacent to layer 210, with an arrow indicating its direction of movement. The leveler 230 removes excess, non-solidified resin material to improve the printing accuracy. In FIG. 2C, leveler 230 is shown a portion of the way through its leveling of layer 210. The leveler 230 shown is an example and other directions of movement and suitable levelers are also contemplated.

Figure 2D:
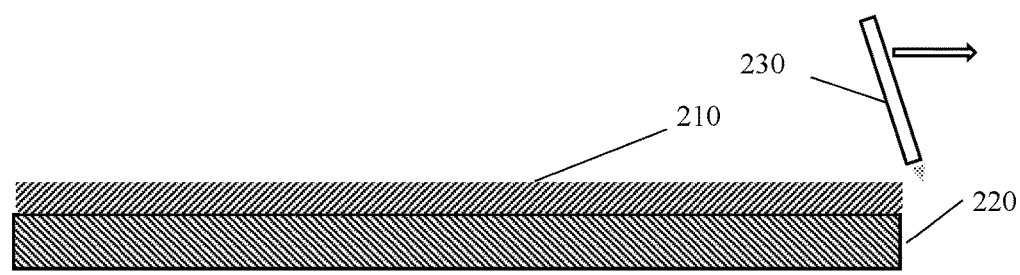

FIG. 2D shows layer 210 once the leveling of layer 210 is complete, and excess resin material from layer 210 is removed. A vacuum (not shown), for example, can be used to remove the excess resin and deposit it in a waste bin or reservoir. If layer 210 is made of one resin material and not multiple materials, the excess material can be recycled and recirculated to the print head 200 in order to form another layer (not shown). If instead multiple materials make up layer 210, then the excess material cannot be re-used and is deposited in a waste bin and ultimately discarded. A curing component (not shown) can be run along and exposed to layer 210 after the excess material is removed, in order to cure layer 210. The curing component for photopolymeric liquid resins is an ultraviolet (UV) light. Other suitable resins and curing components are also contemplated by the disclosure. Exemplary suitable resins can include acrylates, epoxies, urethanes, polyesters, silicones and combinations thereof. The steps shown in FIGS. 2A-2D can be repeated as necessary for a plurality of layers to form a 3D object.

Figure 3:
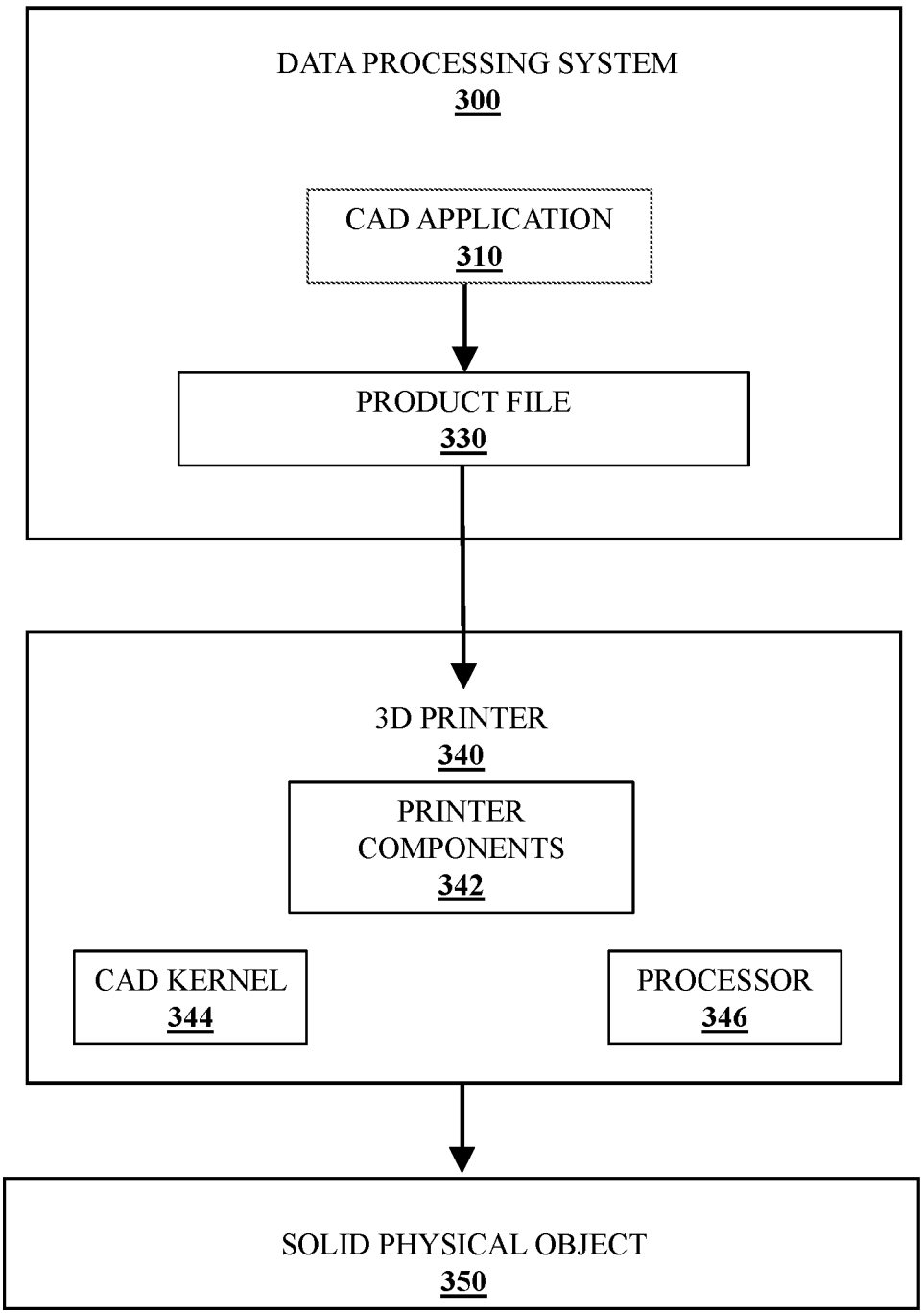
FIG. 3 is a block diagram illustrating an interaction of various components, including a 3D printer, according to illustrative embodiments.

FIG. 3 is a block diagram illustrating an interaction of various components, including a 3D printer 340, according to illustrative embodiments. In this figure, a data processing system 300 includes a CAD application 310. The CAD application 310 can operate, including interacting with a user, to create a product file 330. Product file 330 can be a CAD file, such as a JT file, that defines a product to be manufactured by including one or more of a product structure, including e.g., layer information, visualizations, and levels of details, b-rep geometry, PMI, and data organization. Alternatively, the product file 330 can be a product of another program file, such as a STEP file that stores similar information or a .stl file that can be converted to a JT file.

The product file 330 can be received by 3D printer 340 that can include a CAD kernel 344 and a processor 346, as well as other conventional 3D printer components 342. The CAD kernel 344 can be a Parasolid, for example. The processor 346 and CAD kernel 344 can directly read and interpret the product file 330, and use product file 330 to produce the product/object using 3D printing techniques. 3D printer components 342 can include such components as a frame, head movement mechanics, motors, print heads/extruders, and electronics such as a controller, interface circuitry, and others, as well as the firmware to control each of these. 3D printer components 342 can also include a user interface to allow a user to view, modify, or otherwise manipulate a solid model represented by the product file 330 on the 3D printer 340 itself before, during, or after printing to produce a solid physical object 350. Additional printer components that involve the method and system of the present disclosure are shown in FIG. 4, and described in more detail herein below.

Figure 4:
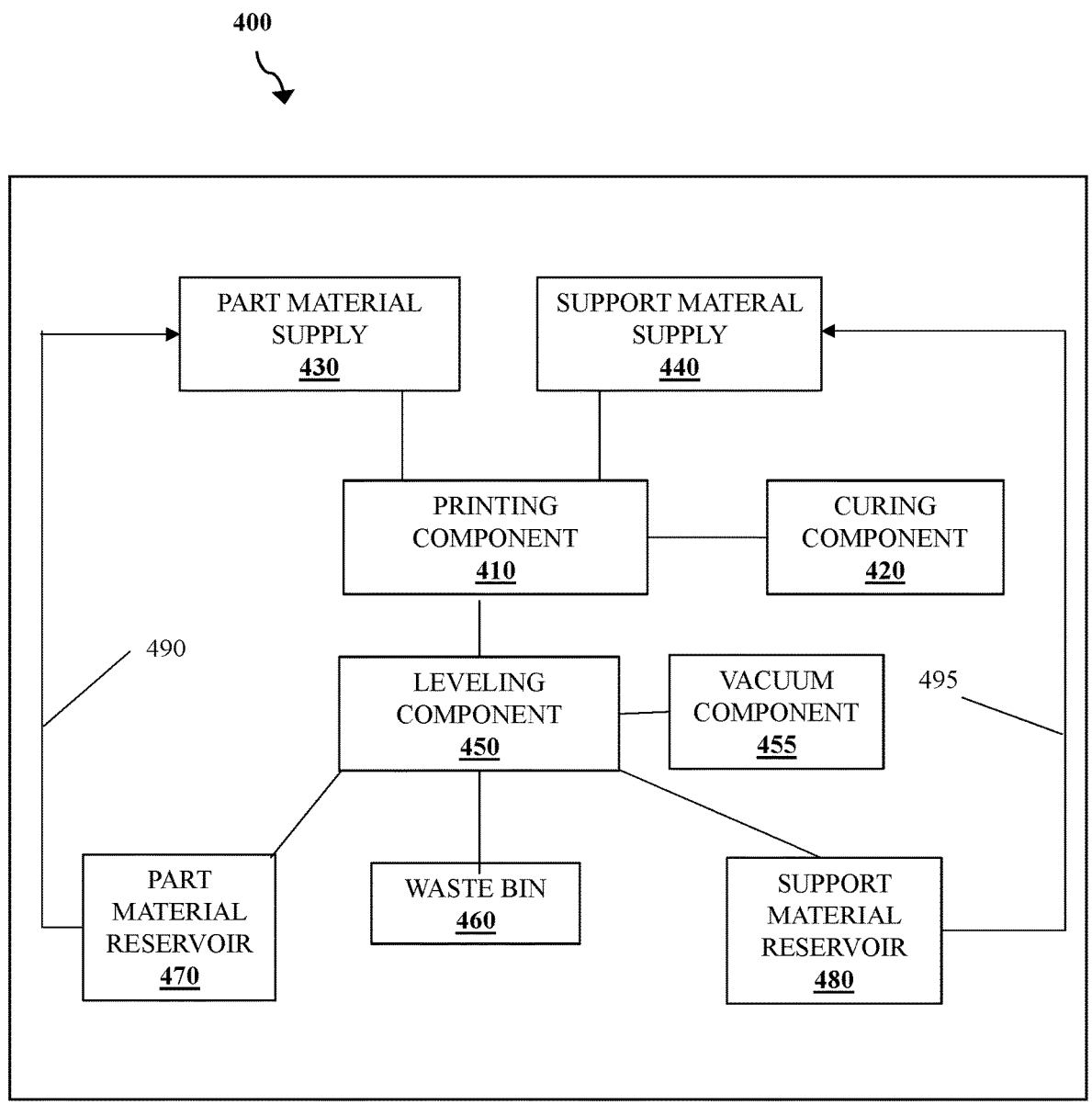
FIG. 4 is a block diagram illustrating an interaction of 3D printer components, according to illustrative embodiments.

FIG. 4 is a block diagram of 3D printer components that comprise an illustrative system 400 that can be employed to perform the method of the present disclosure. System 400 includes a printing component 410, which can further include, for example, a print head, etc. (not shown). In one example, the printing component 410 can move along a build tray and can deposit layers of resins on the build tray or on earlier-deposited layers, according to instructions from a product file. In material jetting 3D printers, photopolymeric liquid resins in the form of ink are directly sprayed in the same way as an inkjet printer to make a two-dimensional (2D) structure and repeatedly stacked to produce a three-dimensional (3D) shape. A curing component 420 can subsequently be moved along the layer laid down by the printing component 410 either in an opposite direction or the same direction, for example, in order to cure each layer as it is printed or jetted in order to avoid collapse of the structure. The layers are each cured via exposure to UV light, solidifying them into solid material matching a programmed CAD file, for example. Such a process repeats itself layer by layer until an entire part has been constructed.

Photopolymers that can be used in the method and system disclosed herein are numerous. PolyJet 3D parts, for example, can be made in over one-hundred (100) different materials. Material properties can range from rubber to rigid, transparent to opaque, and standard to biocompatible. Some examples of photopolymeric materials that are suitable in the disclosed methods and apparatuses include, but are not limited to, broad categories of materials including acrylates, epoxies, polyesters, silicones, and combinations thereof.

More specifically, some exemplary materials that are suitable include, but are not limited to, Agilus30™, MED610™, MED625FLX™, Digital ABS Plus™, MED670™, MED690™, MED620™, DraftGray™, Elastico™, Durus™, VerClear™, VeraUltraClear™, VeroBlue™, VeroVivid™, and Vero PureWhite™, for example.

After each layer is deposited, and before being cured, a leveling component 450 can be used to remove excess, non-solidified resin material to improve printing accuracy. The programmed CAD file that determines how the resins are laid down in layers to form a part is used to also identify if a single or multiple resin materials are present in a given layer that is being leveled by the leveling component 450. If more than one material is included or used in a given layer, then the excess material is not recyclable or re-usable, so it is disposed of, or discarded in a waste bin 460. A vacuum component 455 can be used to remove the excess resin and deposit it in the waste bin 460, for example. However, if only one resin material is used in a given layer, then the excess material can be recycled, re-used or re-circulated. If the one material is part material, then it can be vacuumed up (by vacuum component 455, for example) and deposited in a part material reservoir 470, and if the one material is support material, then it can be vacuumed up (by vacuum component 455, for example) and deposited in a support material reservoir 480. More than one vacuum component can be used, with one for each material resin being possible. Alternatively, a single vacuum can be used and can include a valve component (not shown) that is switched in order to deliver each different material resin to its proper reservoir, as determined by the product file or CAD file.

The part material and support material reservoirs 470, 480 can be connected via two recirculation (or "recycle" or "re-use") loops 490, 495, respectively, to the part material supply 430 and the support material supply 440, respectively, in order to recirculate the excess materials back to the printing component 410. The two recirculation loops 490, 495 allow excess (leveled-off) support material and part material resin to be collected and re-used, which reduces the amount of material that goes into the waste bin, thereby lessening the environmental impact of material jetting. The two recirculation loops 490, 495 can comprise tubing or any other suitable components to enable excess material to be returned for re-use to part material supply 430 and support material supply 440, and then to the printing component 410. A benefit of being able to recycle or recirculate support resin or part resin is that the cost of 3D printing can be lowered, as the resins are quite expensive. A further benefit of recirculation is that a reduction of waste resin in the waste bin reduces the amount of toxic waste resin, which is difficult to dispose of.

The present disclosure addresses use of one part material and one support material in a given 3D part. However, it is contemplated that a 3D printer may be able to lay down more than two materials, or a plurality of materials, in a 3D object. As long as only one material is used in a given a layer, the excess material can be recirculated back to a printing component for re-use through one of a plurality of recirculation loops, and can be used to print additional layers. If more than one material is used (no matter the number), however, the excess material can be discarded as waste.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

"3D printer" is defined as "a machine used for 3D printing" and "3D printing" is defined as "the fabrication of objects through the deposition of a material using a print head, nozzle, or another printer technology."

Synonyms associated with and encompassed by 3D printing include additive fabrication, additive processes, additive techniques, additive layer manufacturing, layer manufacturing, and freeform fabrication. "Additive manufacturing (AM)" is defined as "a process of joining materials to make objects from 3D model data, usually layer upon layer, as opposed to subtractive manufacturing methodologies. Additive manufacturing (AM) may also be referred to as rapid prototyping (RP). As used herein, "3D printing" is generally interchangeable with "additive manufacturing" and vice versa.

"Printing" is defined as depositing of a material using a print head, nozzle, or another printer technology.

In this disclosure, "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for reducing waste during 3D printing of a 3D article, comprising the steps of:
    depositing a photocurable polymer composition with a 3D printer to form a layer, wherein the photocurable polymer composition comprises at least one of a first photocurable polymer resin and a second photocurable polymer resin; and
    for each layer, determining if more than one photocurable polymer resin is included in the photocurable polymer composition forming each layer;
        wherein for each layer that includes more than one photocurable polymer resin,
            leveling the layer which produces excess material including more than one photocurable polymer resin, and depositing the excess material including more than one photocurable polymer resin in a waste bin; and
        wherein for each layer that includes only one photocurable polymer resin,
            determining if the one photocurable polymer resin is a support material,
                wherein for each photocurable polymer resin that is the support material, leveling the layer which produces excess support material, and depositing the excess support material in a support material recirculation loop configured to re-use the excess support material in the printing step, and
                wherein for each photocurable polymer resin that is not the support material, leveling the layer which produces excess part material, and depositing the excess part material in a part material recirculation loop configured to re-use the excess part material in the printing step.

2. The method of claim 1, further comprising curing each layer after leveling.

3. The method of claim 1, further comprising optionally repeating the steps of claim 1 for any additional layer needed to print the article.

4. A method for reducing waste during 3D printing of a 3D article, comprising the steps of:
    depositing a photocurable polymer composition with a 3D printer to form a layer, wherein the photocurable polymer composition comprises at least one of a first photocurable polymer resin and a second photocurable polymer resin; and
    for each layer, determining if only one photocurable polymer resin is included in the photocurable polymer composition forming each layer;

wherein for each layer that includes only one photocurable polymer resin, determining if the one photocurable polymer resin is a support material,
    wherein for each photocurable polymer resin that is the support material, leveling the layer which produces excess support material, and depositing the excess support material in a support material recirculation loop configured to re-use the excess support material in the printing step, and
    wherein for each photocurable polymer resin that is not the support material, leveling the layer which produces excess part material, and depositing the excess part material in a part material recirculation loop configured to re-use the excess part material in the printing step.

5. The method of claim 4, further comprising curing each layer after leveling.

6. The method of claim 4, further comprising optionally repeating the steps of claim 4 for any additional layer needed to print the article.

7. A system for reducing waste during 3D printing of a 3D article, comprising:
   a printing component configured to print a plurality of layers to form the 3D article, wherein each of the plurality of layers comprises at least one of a first curable material and a second curable material;
   a leveling component configured to remove excess material from each of the plurality of layers after each layer is deposited;
   a first recirculation loop configured to return the excess material from each of the plurality of layers that includes only the first curable material back to the printing component for re-use;
   a second recirculation loop configured to return the excess material from each of the plurality of layers that includes only the second curable material back to the printing component for re-use; and
   a waste bin configured to receive the excess material from each of the plurality of layers that includes both the first curable material and the second curable material.

8. The system of claim 7, further comprising a curing component configured to cure each of the plurality of layers.

9. The system of claim 8, wherein the curing component includes a UV light.

10. The system of claim 7, wherein the first and second curable materials comprise a photopolymer liquid resin.

11. The system of claim 7, wherein the first curable material comprises a part material.

12. The system of claim 7, wherein the second curable material comprises a support material.

13. The system of claim 11, further comprising a part material reservoir that collects the excess material leveled from each of the plurality of layers that includes only the first curable material.

14. The system of claim 12, further comprising a support material reservoir that collects the excess material leveled from each of the plurality of layers that includes only the second curable material.

15. The system of claim 13, wherein the first recirculation loop returns the excess material from the part material reservoir to a part material supply connected to the printing component.

16. The system of claim 14, wherein the second recirculation loop returns the excess material from the support material reservoir to a support material supply connected to the printing component.

17. The system of claim 7, further comprising a data processing system including a CAD application that is configured to instruct the printing component how to print the plurality of layers to form the 3D article.

18. The system of claim 7, further comprising at least one vacuum component configured to vacuum the excess material leveled from each of the plurality of layers.

19. The system of claim 18, wherein the at least one vacuum component is configured to provide the excess material leveled from each of the plurality of layers to the first recirculation loop, the second recirculation loop and the waste bin.

20. The system of claim 7, further comprising a computer application configured to determine whether each of the plurality of layers comprises the first curable material, the second curable material or both the first and second curable materials, and determine whether the excess material is returned to the printing component through the first recirculation loop or the second recirculation loop or whether the excess material is received by the waste bin.

* * * * *